United States Patent
Tchedikian (10) Patent No.: US 11,436,914 B2
(45) Date of Patent: *Sep. 6, 2022

(54) METHODS FOR THE DETERMINATION AND CONTROL OF A PIECE OF EQUIPMENT TO BE CONTROLLED; DEVICE, USE AND SYSTEM IMPLEMENTING THESE METHODS

(71) Applicant: 7HUGS LABS SAS, Issy-les-Moulineaux (FR)

(72) Inventor: Simon Tchedikian, Issy-les-Moulineaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,359

(22) Filed: Feb. 20, 2019

(65) Prior Publication Data

US 2019/0180609 A1    Jun. 13, 2019

Related U.S. Application Data

(63) Continuation of application No. 15/935,858, filed on Mar. 26, 2018, now Pat. No. 10,255,799, which is a (Continued)

(30) Foreign Application Priority Data

Jul. 25, 2014 (FR) ........................ 1457234

(51) Int. Cl.
*G08C 17/02* (2006.01)
*G06F 3/01* (2006.01)
*G06F 3/0346* (2013.01)

(52) U.S. Cl.
CPC ............. *G08C 17/02* (2013.01); *G06F 3/017* (2013.01); *G06F 3/0346* (2013.01);
(Continued)

(58) Field of Classification Search
CPC ............... G08C 17/02; G08C 2201/20; G08C 2201/71; G08C 2201/91; G06F 3/017; G06F 3/0346
See application file for complete search history.

(56) References Cited

U.S. PATENT DOCUMENTS 6,073,043 A    6/2000   Schneider
7,388,468 B2   6/2008   Diorio et al.
(Continued)

FOREIGN PATENT DOCUMENTS

CN    2535849 Y    2/2003
CN    1476585 A    2/2004
(Continued)

OTHER PUBLICATIONS

Dao et al., "Home Appliance Control System based on Robust Indoor User Localization using Wifi," International Journal on Human Machine Interaction, vol. 1, Issue 1, 2013, 10 pages.
(Continued)

*Primary Examiner* — Quan Zhen Wang
*Assistant Examiner* — Rajsheed O Black-Childress
(74) *Attorney, Agent, or Firm* — Withrow & Terranova, P.L.L.C.

(57) ABSTRACT

Provided is a control object and a method for controlling a plurality of pieces of equipment. The method includes determining, with the control object, a piece of equipment to be controlled from the plurality of pieces of equipment based on a user pointing the control object at the piece of equipment to be controlled, adapting, with the control object, a control interface of the control object as a function of the piece of equipment to be controlled, receiving, through the control interface of the control object, at least one command from the user to control the piece of equipment to be controlled, generating, with the control object,
(Continued)

control data configured to control the piece of equipment to be controlled based on the at least one command received from the user, and controlling the piece of equipment to be controlled by transmitting the control data with the control object.

42 Claims, 3 Drawing Sheets

Related U.S. Application Data continuation of application No. 15/329,111, filed as application No. PCT/EP2015/066839 on Jul. 23, 2015, now Pat. No. 10,068,463.

(52) U.S. Cl.
CPC ..... *G08C 2201/20* (2013.01); *G08C 2201/71* (2013.01); *G08C 2201/91* (2013.01)

(56) References Cited

U.S. PATENT DOCUMENTS

| | | | |
|---|---|---|---|
| 9,047,759 B2 | 6/2015 | Yamada et al. | |
| 10,068,463 B2 | 9/2018 | Tchedikian | |
| 10,255,799 B2 | 4/2019 | Tchedikian | |
| 2005/0033835 A1* | 2/2005 | Kinjo | G08C 17/00 709/223 |
| 2005/0225453 A1 | 10/2005 | Chang et al. | |
| 2011/0095978 A1* | 4/2011 | Pehlivan | G08C 17/00 345/158 |
| 2011/0302535 A1 | 12/2011 | Clerc et al. | |
| 2012/0127012 A1* | 5/2012 | Gicklhorn | G06F 1/1694 341/176 |
| 2012/0154108 A1* | 6/2012 | Sugaya | H04N 21/4126 340/5.1 |
| 2014/0249657 A1* | 9/2014 | Yurasits | G05B 15/02 700/90 |

FOREIGN PATENT DOCUMENTS

| | | |
|---|---|---|
| CN | 101017190 A | 8/2007 |
| CN | 103428548 A | 12/2013 |
| FR | 2985584 A1 | 7/2013 |
| JP | 4298954 B2 | 7/2009 |

OTHER PUBLICATIONS

Non-Final Office Action for U.S. Appl. No. 15/329,111, dated Nov. 17, 2017, 6 pages.
Notice of Allowance for U.S. Appl. No. 15/329,111, dated May 7, 2018, 8 pages.
Non-Final Office Action for U.S. Appl. No. 15/935,858, dated May 17, 2018, 7 pages.
Notice of Allowance for U.S. Appl. No. 15/935,858, dated Nov. 29, 2018, 7 pages.
First Office Action for Chinese Patent Application No. 201580046115. 7, dated Mar. 5, 2019, 17 pages.
First Search for Chinese Patent Application No. 2020103211902, dated Nov. 20, 2020, 1 page.
Extended European Search Report for European Patent Application No. 19186715.9, dated Sep. 11, 2019, 14 pages (including translation).
Examination Report for European Patent Application No. 19186715. 9, dated Jan. 20, 2021, 11 pages (including translation).
International Search Report and Written Opinion for International Patent Application No. PCT/EP2015/066839, dated Nov. 6, 2015, 17 pages.
International Preliminary Report on Patentability for International Patent Application No. PCT/EP2015/066839, dated Feb. 9, 2017, 13 pages.
Office Action for Canadian Patent Application No. 2956102, dated Aug. 20, 2021, 9 pages.
Second Office Action for Chinese Patent Application No. 202010321190. 2, dated Oct. 9, 2021, 12 pages.
Notice of Preliminary Rejection for Korean Patent Application No. 1020177003971, dated Oct. 31, 2021, 7 pages.

\* cited by examiner

METHODS FOR THE DETERMINATION AND CONTROL OF A PIECE OF EQUIPMENT TO BE CONTROLLED; DEVICE, USE AND SYSTEM IMPLEMENTING THESE METHODS

RELATED APPLICATIONS

This application is a continuation application of U.S. patent application Ser. No. 15/935,858 filed Mar. 26, 2018, which is a continuation application of U.S. patent application Ser. No. 15/329,111 filed Jan. 25, 2017, now U.S. Pat. No. 10,068,463, which is the United States national phase of International Application No. PCT/EP2015/066839 filed Jul. 23, 2015, which claims priority to French Patent Application No. 1457234 filed Jul. 25, 2014, the disclosures of which are hereby incorporated in their entirety by reference.

BACKGROUND

The invention relates to the field of remote controls. More specifically, the invention relates to methods for determining and controlling a piece of equipment to be controlled. The invention also relates to a use, a device and a system implementing these methods.

Remote controls are known from the state of the art for determining and controlling a piece of equipment to be controlled based on a determination of the position of the remote control on a map and its orientation.

For example the document "Home Appliance Control System based on Robust Indoor User Localization using Wifi" by Dhao et al., published by the journal "International Journal on Human Machine Interaction" in 2013 is known. This document describes a system comprising a remote control which in an automatic mode is pointed by a user at a piece of equipment. In this automatic mode, the user controls the piece of equipment at which the remote control is pointed, which is associated with the geographical zone in which it is physically present. The document describes a system determining the piece of equipment based on the user localization and the orientation of the remote control.

Nevertheless, this known solution has various limitations. On the one hand, the system requires training with respect to the position of the pieces of equipment prior to the use of the remote control.

On the other hand, a server must store a map of the environment which contains information on the floors, the zone boundaries, the walls, the siting of each piece of equipment, and the mapping associating the zone with the piece of equipment. Preparation of this map is carried out prior to the use of the remote control. In addition, adding, removing or moving pieces of equipment requires the map to be updated.

Finally, the remote control localization is carried out by training all the zones (training called "fingerprinting"). This training must be carried out prior to the use of the remote control and must be carried out regularly. For example, adding or moving a WiFi station in the environment involves carrying out a new training according to the teaching of this document. This method therefore cannot be used for easy deployment by private individuals in their homes.

For reference, indoor localization technologies are known, such as UWB or EMF.

Ultra wideband (UWB) technology is a technology that makes it possible to geolocate items indoors with an accuracy of the order of a few centimeters to a few tens of centimeters. In order to determine the orientation, another technology is required.

Electromagnetic field (EMF) technology is another technology capable of determining position and orientation. The range of such technology is of the order of 2.5 to 5 metres. This technology is fully disclosed in the document U.S. Pat. No. 6,073,043.

SUMMARY

Home automation has existed for several decades. The convenience provided by home automation products is significant: control of lights, blinds, entrance doors, heating, connected items, etc. However, home automation has never managed to extend beyond the microcosm of technophiles to reach the general public. This is mainly due to the complexity of configuration and use of all these products. A few initiatives like Hue bulbs from Philips or the Somfy iPhone app for controlling electric blinds have had some success with the public. However, these initiatives are still limited to a single application: each remote control only functions with the piece of equipment that it was supplied with, and does not function for controlling other products.

Some players in the market are offering multi-use home automation remote controls for controlling several pieces of equipment at once, but these products are very complicated to configure. Buttons of the remote control must be associated with specific actions: button 1 for switching the living-room light on/off, button 2 for reducing the heating, button 3 for increasing the heating, etc. It quickly becomes difficult to remember which function the button is associated with.

Home automation for smartphones or tablets is also experiencing rapid expansion. These devices allow the user to browse a menu and access the piece of equipment that he wants to control. This solution is more ergonomic for the user, but still remains restrictive. For example, to switch on the light in the living-room, the user must switch on his smartphone or tablet, select the home automation app, enter the control menu for the lights or the "living-room" menu, select the bulb that he wants to control, and press the "switch on" button. The number of steps for switching on a bulb is still too great, and the user must remember the position of the pieces of equipment to be controlled within the menus and sub-menus of the app.

A purpose of the invention is to make it possible to control everything that can be controlled in a house without any complicated configuration and without the need to go through a large number of steps.

A purpose of the invention is in particular to overcome all or part of the aforementioned drawbacks by proposing a method for the determination of a piece of equipment to be controlled by a portable control object placed in a space comprising positioning units. To this end, the invention relies on the implementation of the localization units capable of determining their relative positions in relation to one another.

These localization units can for example utilize environment localization chips based on ultra wideband (UWB) technology.

The localization of these localization units can furthermore be carried out based on lateration, tri-lateration or multi-lateration methods.

An idea on which the invention is based consists of associating these localization units with a portable control object. According to the invention, the portable control object can advantageously be capable of determining its relative position with respect to the different localization units.

The same well known methods which allow the positioning units to determine their relative positions in relation to one another allow the remote control or a third device to know the relative position of the remote control with respect to the different localization units.

Throughout the remainder of the document, it is understood that the concept of controlling a piece of equipment can be summarized as the remote control obtaining a command interface with respect to this piece of equipment.

The concept of control of a piece of equipment can also be summarized as a simple information command relating thereto. Thus, by control of an oven using a remote control is meant the capability of pointing this remote control at this oven for the purpose of obtaining the remaining cooking time, even if it is not possible to control the oven physically. This is an oven interrogation command.

The concept of controlling a piece of equipment can also cover the actual physical control of this equipment.

More generally, any interaction with the piece of equipment will be understood as a command thereof.

Thus, according to a first aspect of the invention, a method is proposed for the determination of a piece of equipment to be controlled by a portable control object placed in a space comprising a positioning unit capable of determining the relative position of the control object with respect to this positioning unit, the method comprising:

a step of determination of the position and orientation of said control object in said space based on the position of the at least one positioning unit, a step of determination of a direction and a sense of pointing by the control object based on the position and orientation of the control object that have been determined in this way, a step of determination of a piece of equipment to be controlled in the space based on the direction and sense that have been determined in this way.

According to a feature of the invention, the step of determination of a piece of equipment to be controlled comprises a notification of this determination to a user of the control method. Preferably, this notification is carried out by a transmission of a sound or a vibration by the control object. Advantageously, the transmission of a sound or a vibration by the control object makes it possible for a user of the method for determination of a piece of equipment to be controlled to locate items in the space without looking at the control object.

Advantageously, said control object can be a remote control.

Advantageously, the space can comprise a plurality of positioning units capable of determining their relative positions in relation to one another.

The determination by a positioning unit of its position with respect to another positioning unit can generate a notification of information relating to this determination sent to a user of the determination method. This information can for example be displayed on a screen of the control object. This information can alert the user to poor positioning of one or more of the positioning units. This can be the case for example when an obstacle or a wall is situated between two positioning units. This can be the case (in addition or alternatively) when three positioning units are aligned: the alignment of three positioning units reduces the accuracy of the determination of the position and/or the orientation of the control object.

Thus, the implementation of localization units capable of determining their relative positions in relation to one another makes it possible to determine a piece of equipment without the need to produce beforehand a map of the environment which contains information on the floors, the zone boundaries, the walls, the siting of each piece of equipment, and the mapping associating the zone with the equipment.

However, this type of information can advantageously be used to effectively distinguish the equipment to be controlled as a function of the position/orientation pair of the control object.

A piece of equipment can be an electrical socket, a roller blind, audiovisual or computer devices, a burglar alarm, a smoke detector, a CO detector, a thermostat, a doorway, a lock, a toy such as an electric car, appliances such as a coffee machine, an alarm clock, a clock, a piece of kitchen equipment such as an oven, an extractor hood, a refrigerator, a dishwasher, etc.

Moreover, a change in the positioning of a localization unit or the addition of a new localization unit does not require a new training in order to determine the position of the control object in the space relative to the localization units.

Advantageously, the step of determination of the position and/or the step of determination of the orientation of the control object in the space can comprise a step of assessing the travel time of a radio signal between the control object and a positioning unit, or between several positioning units.

Advantageously, the step of determination of the position and/or the step of determination of the orientation of the control object in said space can comprise a step of assessing the received power of a radio signal by the control object or by the at least one positioning unit.

Advantageously, the step of determination of the position and/or the step of determination of the orientation of the control object in the space can comprise a step of determination of the angles of reception of a radio signal by the control object or by the at least one positioning unit.

Advantageously, the step of determination of the position and/or the step of determination of the orientation of the control object in said space can implement a utilization and a measurement of electromagnetic fields.

Advantageously, the step of determination of the position of the control object and/or the step of determination of the orientation in said relative space can implement a step of lateration, tri-lateration or multi-lateration.

Preferably, the step of determination of the position of the control object in said space can implement a step using a technique implementing radio signal time of arrival such as the TOA technique and/or the time differences of arrival such as the TDOA technique and/or angles of arrival such as the AOA technique.

Advantageously, the step of determination of the position and/or the step of determination of the orientation of the control object in said relative space can implement a triangulation step.

Preferably, the step of determination of the position and the orientation of the control object in this space can implement a step utilizing a measurement of an electromagnetic field.

The distances between the control object and the positioning units can be determined according to several methods. A first family of such methods implements a calculation of the travel time of a radio signal between the control object and the positioning units. A second family implements a calculation of the received power of a radio signal on the positioning units side or the control object side. A combination of these methods can advantageously be used in order to improve the accuracy of the localization of the control object in the space comprising the positioning units.

Advantageously, the method according to the invention can comprise a step implementing a determination of the angle of reception of a radio signal received by the control object or by the at least one positioning unit. The angle of reception of the radio signal can advantageously improve the accuracy of the position and the orientation of the portable control object for a given number of positioning units. The angle of reception of the radio signal can advantageously make it possible to implement a triangulation by using at least one positioning unit.

Advantageously, the method according to the invention can comprise a step implementing a capture by the control object of physical variables in the space.

A capture by the control object of physical variables in the space can advantageously improve the accuracy of the orientation of the control object. The physical variables can for example be captured by an accelerometer, a gyroscope, or a terrestrial magnetic field sensor. Several physical variables can be captured in order to further improve the accuracy of the determination of the localization and/or the orientation of the control object. A pressure or altitude sensor could improve these determinations still further.

Advantageously, the method according to the invention can comprise a step implementing a capture by the control object of the distance between the latter and an obstacle situated in the direction in which the control object is pointed. A capture by the control object of the distance between the latter and an obstacle situated in the direction in which the control object is pointed can advantageously improve the accuracy.

Advantageously, the method according to the invention can comprise a step for associating a frame of reference linked to the control object with a frame of reference linked to the at least one positioning unit. Preferably, the step of associating the frame of reference linked to the control object with the frame of reference linked to the at least one positioning unit comprises for each of the positioning units a step comprising the user pointing this control object at a positioning unit and pressing on this control object. Thus, when the step of positioning of the positioning units is not carried out in the same frame of reference as the step of orientation of the remote control, the two frames of reference are linked. In this case, the user may be required to point at certain positioning units and press a button and capture the orientation for each positioning unit. It is thus possible to link the orientation of the remote control with the space of the positioning units. Preferably, in this case, each piece of equipment to be controlled can be activated so that the user knows at which piece of equipment he must point. The activation can be seen by utilizing a flashing of a bulb, the raising and/or lowering of blinds, etc.

Advantageously, the method according to the invention can comprise a step for defining a virtual envelope of at least one piece of equipment to be controlled. The step of determination of a piece of equipment to be controlled can in this case use the virtual envelope defined for at least one piece of equipment to be controlled. Advantageously, defining the virtual envelope allows the implementation of a margin of tolerance such that the equipment to be controlled can be determined even if the control object does not point perfectly at its virtual envelope.

Advantageously, the virtual envelope can be defined on the basis of a plurality of determinations of position and orientation of the control object in the space. For example, the virtual envelope can be defined by the determination of the convex envelope of the projection of the senses indicated by pointing over a particular volume. The control object can implement a method of training the localization of the piece of equipment to be controlled by pointing at its virtual envelope. The user can be required to point at one and the same piece of equipment or one and the same virtual envelope in the space having several different positions in order to be able to determine the relative position of the piece of equipment or virtual envelope in the space.

Advantageously, the step of determination of the virtual envelope can comprise a step of activation of at least one of the pieces of equipment to be controlled in order to render it visually identifiable by the user and a step comprising the user pointing the control object at this at least one piece of equipment and pressing on the control object. For example, in order to control blinds, it is possible to require the user to point at two corners of the window, for example the top left and the bottom right. The virtual envelope delimits the zone of the piece of equipment to be controlled in the space. When the user points at anywhere on the window, the system recognises that the zone pointed at corresponds to the control of the blinds.

Advantageously, the virtual envelope of the at least one piece of equipment to be controlled can comprise at least a part of the physical envelope of the piece of equipment to be controlled, preferably all of the physical envelope. For example, the virtual envelope of a television can then comprise at least the physical envelope of the television.

Alternatively and advantageously, it is possible for the virtual envelope of the at least one piece of equipment not to comprise any point of the physical envelope of the piece of equipment to be controlled. It is thus permissible to define that the piece of equipment to be controlled, when the control object points at the centre of a fireplace of an apartment, is the warm/cool air conditioning system of the apartment, possibly situated in a room other than that of the fireplace, and not the fireplace being pointed at. The user can for example point at the window to have the weather outdoors displayed on the remote control. He can also control objects that are not directly visible.

Advantageously, the method according to the invention can comprise a step of moving a piece of equipment to be controlled and an action of a user on the control object, the action of the user on the control object being followed by a new implementation of a method according to the invention in order to determine the new virtual envelope of said moved piece of equipment. This new implementation is preferably carried out automatically as soon as a test is verified. The test can for example comprise a comparison of the distances previously determined between all the pieces of equipment and a new determination of the distances between all of the pieces of equipment. Thus, when the user changes the position of a bulb, its new location is automatically taken into account when a command is pressed on the remote control.

Alternatively, the step of determination of a piece of equipment to be controlled can comprise a step of determination of a probability that a piece of equipment is the piece of equipment to be controlled. The piece of equipment to be controlled can then be determined based on this probability. This determination of a probability can advantageously be implemented in order to determine the piece of equipment to be controlled when the direction of pointing does not correspond to any virtual envelope or corresponds to more than one virtual envelope. Thus, when the control object is pointed in one direction, and if the direction in which it is pointed does not correspond to any piece of equipment, then an algorithm identifies the piece of equipment to be controlled that is the closest thereto in the space or the most probable as a function of the position of the control object and of the direction of pointing.

Advantageously, the method according to the invention can comprise a step of contextual enhancement of a piece of equipment to be controlled by enrichment data and in that the step of determination of a piece of equipment to be controlled implements this contextual enhancement. This enhancement can preferably implement data of physical variables, time, date, the position of the control object, responses of the user to questions, or the pattern of repetition of commands carried out by the user. For example, the contextual enhancement can be implemented by a step of requesting the user for information linked to the piece of equipment to be controlled. This request can be carried out by means of a mobile app or configuration software on a computer. The information can be to determine if the bulb is a ceiling light or standard lamp, or to know on what floor each item is situated. Thus, this information makes it possible to determine the relative height of the positioning units in relation to one another.

Preferentially, the step of determination of a piece of equipment to be controlled can comprise a step of determination of a probability. The piece of equipment to be controlled can then be determined based on this probability. For example, when a determined direction and sense point at at least two virtual envelopes, the determined piece of equipment can be the one the virtual envelope of which is the closest to the control object. For example, when a determined direction and sense do not point at any virtual envelope, the probability of each piece of equipment is determined based on the distance between its virtual envelope and the half line defined by the direction. The concept of distance and proximity depends on the metric used. A metric can be used such as the smallest Euclidean distance between the half line defined by the determined direction and a point of a virtual envelope. Thus, a step of automatic correction is proposed: the method cancels the command previously transmitted and applies the command to the most probable piece of equipment to be controlled.

A further subject of the invention is a method for controlling a piece of equipment to be controlled among at least one piece of equipment to be controlled from a control object. This control method according to the invention comprises a step of determination of a piece of equipment to be controlled implementing a method according to the invention.

Advantageously, the control method according to the invention can comprise a step of transmission by the control object of control data to the piece of equipment to be controlled.

Preferably, the step of determination of the position and the sense of the control object and the step of transmission by the control object of control data to the piece of equipment to be controlled can utilize one and the same radio technology.

Advantageously, the control method according to the invention can automatically transmit commands to a piece of equipment as a function of its position and its orientation in the space.

Advantageously, the step of determination of a piece of equipment to be controlled can be followed by a step of confirmation and/or a step of invalidation of the piece of equipment thus determined.

Preferably, the step of confirmation and/or the step of invalidation can be implemented by a predefined interaction of the user with the control object. When the user points at a piece of equipment to be controlled and activates a command, but the command is sent to another object, the remote control allows the user to indicate that the wrong piece of equipment to be controlled was controlled, via a "correction" or "help" button. The user presses on this button and manually indicates which piece of equipment to be controlled he wanted to control. In this case, the various methods can take account of this information so as to always control the piece of equipment to be controlled that is wanted by the user when he points in that direction.

Advantageously, and after a step of invalidation of the piece of equipment to be controlled, a new step of determination of a piece of equipment to be controlled can be automatically implemented by the control method according to the invention. The method can also comprise a step of cancelling the first transmission sent by the control object.

Advantageously, the step of confirmation and/or the step of invalidation can implement a capture of a physical variable. The predefined interaction is preferably a predefined movement of the piece of equipment to be controlled, carried out by the user. For example, the user can make a specific gesture with the control object which indicates to the various processes that the command executed is not the one wanted by the user. This gesture can be captured by an accelerometer incorporated into the remote control, and can for example be that of shaking the remote control.

Advantageously, the control method according to the invention can comprise a step of automatic discovery for discovering each of the pieces of equipment to be controlled.

Advantageously, the control method according to the invention can comprise an adaptation of a control interface of the control object as a function of the equipment to be controlled.

Advantageously, the control method according to the invention can comprise an interpretation by a touch-sensitive surface of at least one movement of at least one finger of a user on said surface. Preferably, the control data are generated based on this interpretation.

Advantageously, the control method according to the invention can comprise a display by the control interface of an item of information as a function of the piece of equipment determined. When the piece of equipment to be controlled is a thermostat or radiator, the current temperature and/or the set temperature is/are displayed. When the piece of equipment to be controlled is a light or bulb, the ON or OFF state of the bulb is displayed. When the piece of equipment to be controlled is a coloured bulb, the current colour is displayed. When the piece of equipment to be controlled is a blind, the state of the blinds—open or closed—is displayed. When the piece of equipment to be controlled is a doorway, the open or closed state, or a video of a person who rang at the doorway is displayed. When the piece of equipment to be controlled is an oven, the remaining cooking time and/or the temperature of the oven is/are displayed.

When the control object comprises a screen and when it comprises a detection step, the training step is carried out by a network gateway. Thus, a hub acting as a gateway can automatically detect all the controllable objects connected to the same computer network as the hub.

When the control object comprises a screen, the training can be carried out directly on the screen of the control object.

When it comprises a screen and when it comprises a detection step, the training step is carried out via an app situated on a device connected to a network. This can be an app implemented on a computer or an app implemented on a smartphone or tablet. In the case of the two latter, the control object which can be the computer, the tablet or the smartphone is connected by wire, by a connection of the USB cable type, or wirelessly, by a WiFi or Bluetooth type connection, so as to allow interaction during the training phase.

A purpose of the invention is also to propose a use of a control method characterized in that it implements a control method according to the invention.

A maximum sub-assembly of the assembly of the positioning units is called a topology, such that whatever a positioning unit of said topology may be, its position can be determined, directly or indirectly, by any other positioning unit of said topology.

Thus two topologies can be defined as being independent when there is a positioning unit of the first topology the position of which cannot be known, directly or indirectly, by any one of the positioning units of the second topology.

According to a feature of the use of the control method, all of the positioning units comprise only a single topology.

According to another feature of the use of the control method, all of the positioning units comprise at least two topologies.

Preferably, the use according to the invention can comprise a detection of an action predefined by the user. Preferably, this detection is implemented automatically. This action can be picking up the remote control by the user. The display of the remote control is dynamically adapted in real time as soon as the remote control is picked up by the user and its screen displays the information associated with everything it is pointed at.

Preferably, the use according to the invention can comprise a step of detection of a physical variable such as the acceleration of the control object. Preferably, this detection is implemented automatically. An accelerometer can thus detect the movements of the remote control and switch on the display and/or conversely, when the remote control is put down and no longer moves, then the display is automatically switched off.

Advantageously, the use according to the invention can comprise management of a screen of the control device based on this detection. This management can be carried out automatically. Thus, when the user grips the control object, the screen management can power the screen. When the user puts down the control object, the screen management can switch off the screen.

Advantageously, the use according to the invention can comprise a plurality of automatic implementations of the control method according to the invention. Thus, the control object is capable of controlling the pieces of equipment continuously, as a function of its position and its orientation. In the case where the control object has a screen, the display shown by the screen is automatically and/or dynamically adapted as a function of the piece of equipment determined by the control object. Moving the control object between two remote pieces of equipment, together with automatic implementation of the control method according to the invention also has the advantage of allowing control of two remote pieces of equipment with the same control object, when the latter is moved from one of the two pieces of equipment to the other, despite said two pieces of equipment not necessarily belonging to the same topology.

Advantageously, the use according to the invention can comprise a step of definition of habit data. The use according to the invention can comprise a plurality of implementations of the control method as a function of said habit data. The habit data can be associated with a gesture of a user or a press on the control object. For example, when the user activates a key or points in the direction of a zone of the room, all the commands are sequenced. It is thus possible to envisage that a user wants to control all his lights at once, but pointing at a specific zone of the room. This advantageously means that he does not need to point at each light in the room in order to control them individually.

Advantageously, the use according to the invention can comprise a step of training habits of commands carried out by the user in order to define the habit data. The user can create macros, using the process for training habits. The macros are sequences of commands launched after a single action by the user. For example, the method for training habits can require the user to point and carry out all the commands that he wants to associate with this macro and associate this command sequence with a key or a zone of the room.

Advantageously, the step of training habits of commands carried out by the user can comprise a step of contextual enhancement by enrichment data. This contextual enhancement preferably implementing data of physical variables, time, date, the position of the control object, responses of the user to questions, or the pattern of repetition of commands carried out by the user. The contextual elements can be for example the time or date or also the position of the remote control. Taking these elements into account is used in order to improve the relevance of the macros or commands and thus predict the wishes of the user. An example is the opening of a blind when a user points at the blinds and presses on a command when it is morning. Another example is the detection by a step of the method of the use of a successive action of a plurality of pieces of equipment to be controlled several times by the user within one and the same time interval. The method for training habits can then use the results of this detection step in order to decide on the activation of this plurality of objects and only when the contextual element of the time interval is the same. A further subject of the invention is to propose a control device of at least one piece of equipment to be controlled in a space by at least one portable control object. The device is characterized in that it comprises:

means for the determination of the position and orientation of said at least one portable control device in said space relative to at least one positioning unit, means for the determination of the position and orientation of said at least one portable control device in said space relative to at least one positioning unit, means for the determination of a direction of a sense of pointing by said at least one control object based on the position and orientation of this control object that have been determined in this way, means for the determination of a piece of equipment to be controlled based on the direction and the sense that have been determined in this way, transmission means configured to transmit a command to the piece of equipment to be controlled determined by the determination means.

Preferably, the control device according to the invention also comprises a touch-sensitive surface and interpretation means in order to interpret at least one movement of at least one finger of a user on this touch-sensitive surface, the transmission means also being configured to generate the command from data originating from the interpretation means.

Advantageously, the device according to the invention can also comprise a screen configured to display information relating to the piece of equipment to be controlled, determined in this way.

Advantageously, the device according to the invention can comprise a sound sensor and analysis means configured to determine a result as a function of the sound captured by the sound sensor and to display this result on the screen. For example, when the control object points at a music source, the device automatically launches a search of the Shazam® type of the current music and displays a result such as the title of the clip, the name of the album, or the artist, on the screen.

An aim of the invention is also to propose a system comprising:
- at least one portable control object arranged in a space,
- at least one positioning unit in this space, the at least one positioning unit being capable of determining the position of the control object and/or its relative position with respect to other positioning units,
- a device for controlling at least one piece of equipment to be controlled according to the invention.

Advantageously, the at least one positioning unit can be incorporated into a piece of equipment to be controlled. The piece of equipment to be controlled can be a connected bulb, a light, a light socket, a wall socket, a wall switch, a thermostat, a mechanism or switch for roller blinds, etc.

Advantageously, communication means comprised in the control object and/or the at least one positioning unit and/or the control device are configured to utilize one and the same radio technology. In this case, the communication of the control command can also use the same radio technology as that used for the localization, for example UWB technology.

Advantageously, the at least one control device can be incorporated into the at least one control object.

Advantageously, the control device can be incorporated into at least one positioning unit.

Advantageously, the control device can be incorporated into the piece of equipment to be controlled.

Advantageously, the system according to the invention can also comprise a network gateway.

Preferably, a network gateway can be configured to automatically detect each of the at least one pieces of equipment to be controlled.

Preferably, a network gateway can comprise the control device, the control device being connected via this network gateway by a wired or wireless connection to the control object and/or to the at least one positioning unit.

Preferably, a network gateway can be configured to sequentially control at least a part of the pieces of equipment to be controlled. Thus, the network gateway can activate each piece of equipment to be controlled individually so that the user can identify it visually. This can be for example a flashing bulb, raising and lowering of blinds, etc.

Advantageously, the control object can be equipped with rechargeable power storage means, and the system can also comprise a base capable of recharging the power storage means.

Advantageously, the control object is a telephone comprising the transmission means of the control device.

Alternatively, the control object can comprise a telephone equipped with an accessory, the control object comprising the transmission means of the control device. This is the case when an additional accessory is added to the smartphone: this accessory can comprise the technology necessary for indoor localization. The physical connection to the smartphone is carried out either by a plug of the jack, USB, lightning, type or wirelessly via a technology of the Bluetooth, BLE, Wifi type etc. This accessory is firmly fixed to the smartphone: thus the position of the smartphone can be determined.

BRIEF DESCRIPTION OF THE DRAWINGS

Other advantages and characteristics of the invention will become apparent on reading the detailed description of implementations and embodiments which are in no way limitative, with reference to the attached drawings, in which.

DETAILED DESCRIPTION

As the embodiments described hereinafter are in no way limitative, variants of the invention can be considered comprising only a selection of the characteristics described hereinafter, in isolation from the other characteristics described (even if this selection is isolated within a phrase containing these other characteristics), if this selection of characteristics is sufficient to confer a technical advantage or to differentiate the invention with respect to the state of the art. This selection comprises at least one, preferably functional, characteristic without structural details, or with only a part of the structural details if this part alone is sufficient to confer a technical advantage or to differentiate the invention with respect to the state of the prior art.

Figure 1:
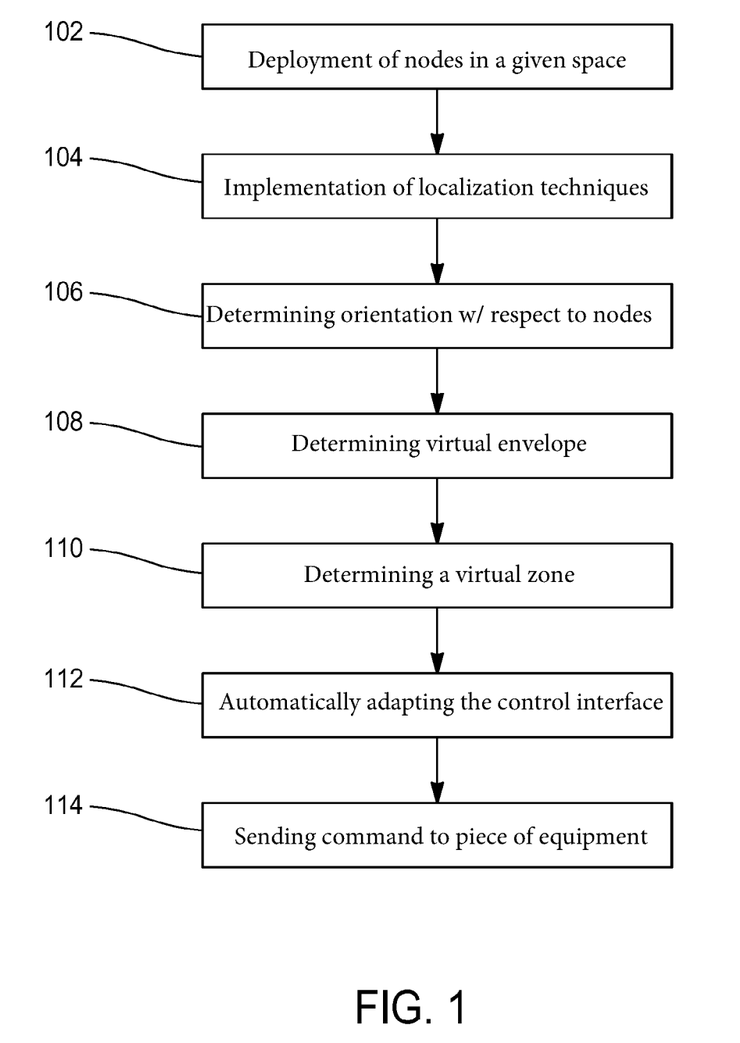
FIG. 1 shows diagrammatically a general embodiment of a method for the determination of a piece of equipment to be controlled according to the invention.

FIG. 1 shows diagrammatically a general embodiment of a determination method 100 of a piece of equipment to be controlled by a control object placed in a space comprising positioning units capable of determining their relative positions in relation to one another.

Step 102 is a step of random deployment of several nodes in a given space. These nodes are controllable pieces of equipment, pieces of data processing equipment or positioning units.

Step 104 is a step of implementation of localization techniques. These techniques are tri-lateration or triangulation based on data relating to a signal received such as angle of arrival (AOA), time of arrival (TOA), time difference of arrival (TDOA), received signal strength indication (RSSI), the quality of the signal received (link quality LQ) or the technique of measuring the electromechanical field. These techniques can be used alone or in combination with the data originating from an accelerometer, a magnetometer or a pressure detection unit.

Step 106 is a step of implementing techniques for the determination of orientation with respect to the nodes. The method implements one or more techniques based on data relating to a signal received such as EMF, EMF, AOA, a transmission with directional antenna or the implementation of one or more sensors such as an accelerometer, a magnetometer or a gyroscope.

In step 108, which is an optional step, a virtual envelope is determined by the user for a piece of equipment to be controlled and the user determines its location with respect to the nodes.

In step 110, the method determines a virtual zone at which the control object is pointed.

In step 112, the method implements an automatic adaptation of the control interface of the control object (its screen, its touch screen and/or its buttons) to the piece of equipment to be controlled selected in the preceding step: information associated with the piece of equipment to be controlled is displayed on the control object, buttons of the control object are available for the user who can also, alternatively or in combination, perform actions.

In step 114, a command associated with the action carried out by the user is sent to the piece of equipment to be controlled associated with the virtual zone at which the control object is pointed.

The determination of the position of the localization units in the space is now described. This determination is relative or absolute: the position is called relative when the positioning units are positioned in relation to one another; the position is called absolute when the positioning units are positioned with respect to a known frame of reference, for example using knowledge of a GPS position. Several localization techniques are possible:
- a first technique implements a calculation of the distances by using one of the following methods or a combination of both:
  - a first method implements a calculation of the travel time of a radio signal between the control object and a positioning unit and between the positioning units.
  - a second method implements a calculation of the received power of the radio signal. The received power is taken either on the side of the control object, or on the side of the positioning unit,
- a second technique implements a calculation of the angles of AOA reception and triangulation,
- a third technique implements a use of electromagnetic fields in order to determine position and orientation in the space,
- of course, it is possible to combine several techniques and to use a plurality of sensors in order to improve the precision of the localization. It is also possible to add sensors in order to facilitate the localization of the various positioning units in the space.

It is for example possible to add a pressure sensor in each positioning unit. This has the advantage of obtaining the altitude of each positioning unit and thus determining the orientation in the space of the positioning units with respect to the terrestrial frame of reference.

In a first case, some positioning units have known positions ("with anchors") with respect to a frame of reference (terrestrial with GPS or other). Several localization techniques are then possible. This makes it possible to obtain an absolute localization of the positioning units with respect to the frame of reference.

In a second case, no positioning unit has a known position ("anchor free") with respect to a frame of reference (terrestrial with GPS or other). Several localization techniques are then possible. This makes it possible to obtain a relative localization of the positioning units with respect to one another.

The determination of the position of the control object is now described. The positioning units make it possible to calculate the position coordinates of the control object in the space. The distances between the control object and the positioning units are calculated and are used to determine the localization of the control object in the space. It is possible to use the same positioning techniques as those used for the determination of the positions of the positioning units. As the portable control object is moveable, its location is determined in real time, and all its movements are calculated (tracking).

The determination of the orientation of the control object with respect to the positioning units is now described.

In a first aspect, the orientation is determined with respect to the terrestrial frame of reference. Sensors, such as accelerometers and magnetometers, make it possible to determine the angle and orientation of the control object with respect to the terrestrial frame of reference.

In a second aspect, the orientation is determined with respect to a known frame of reference: it is possible for example to use electromagnetic fields to determine position and orientation in the space.

When the positioning of the localization units is not carried out with respect to the same frame of reference as the orientation of the control object, it is advisable to link the two. In this case, the user may be required to point at certain positioning units and press a button of the control object in order to capture the orientation of each positioning unit. It is thus possible to link the orientation of the control object with the space of the positioning units. Each piece of equipment capable of being controlled can be activated so that the user knows at which piece of equipment to point the control object. The activation is made visible by a bulb flashing, lowering or raising of blinds, etc.

By using the orientation and the localization of the object in the command space, it is possible to determine the direction in which the control object is pointing and thus identify the piece of equipment to be controlled.

The improvement in the accuracy of the position of the control object is now described.

In a first aspect, the accuracy is improved by using the angle of reception of the signal of the control object by the positioning units. Advantageously, for an equivalent number of positioning units, this makes it possible to obtain a greater accuracy of localization of the control object. In addition, this makes it possible to triangulate the position of the control object while using fewer positioning units: one instead of two, two instead of three, etc.

In a second aspect, the accuracy is improved by adding further sensors in the control object in order to improve the accuracy of the angle calculation: gyroscope, terrestrial magnetic field sensor, etc.

In a third aspect, the accuracy is improved by adding further sensors in the control object making it possible to give movement and displacement information improving the calculation of the geolocation of the control object in the space: accelerometer, gyroscope, terrestrial magnetic field sensor, etc.

In a fourth aspect, the accuracy is improved by adding a pressure or altitude sensor in order to determine for example the altitude and/or the floor where the control object is situated in a building with several floors.

A description will now be given of the possibility of improving the accuracy of the identification of the piece of equipment to be controlled, at which the control object is pointed.

This is made possible by the addition of a distance sensor on the control object: the distance between the control object and the piece of equipment to be controlled is calculated by the distance sensor. This information makes it possible to better determine the piece of equipment to be controlled at which the control object is pointed or the zone at which the control object is pointed, and to avoid controlling a piece of equipment to be controlled which is within the extended direction in which the control object is pointed, in the same room or even in another room.

A description will now be given of the possibility of improving the accuracy of the system by using a contextual method. This is made possible by asking the user via a mobile app or configuration software on a computer for a contextual indication relating to an object to be controlled. For example, a contextual indication relating to a bulb can be to classify the bulb as a ceiling light or standard lamp, or/and indicate the floor on which it is situated. Thus, this information can be used to determine the relative height of the positioning units in relation to one another.

A set of controllable pieces of equipment to be controlled will now be described: light or sockets; roller blinds; music device; thermostat; doorway or lock; toy such as an electric car; coffee machine; gas fire; audiovisual equipment such as television, DVD or BluRay player, camera; computer equipment; third party equipment such as Volets Somfy® blinds, Philips Hue® bulbs, Nest Thermostat®; burglar alarm, smoke detector, CO detector; alarm clock and clock; kitchen equipment such as oven, extractor hood, refrigerator, dishwasher.

The discovery of the pieces of equipment to be controlled can be carried out either by a gateway which automatically detects all the pieces of equipment to be controlled connected to one and the same network; or by a user who manually enters the pieces of equipment to be controlled which must be controlled by the system.

The discovery of the pieces of equipment to be controlled can be carried out directly on the screen of the control object if the control object comprises a screen. The discovery can also be carried out on a computer or via a smartphone or tablet app. In this case, the remote control and the computer, the tablet or the smartphone have a wired (USB cable), or wireless (WiFi or Bluetooth) connection, so as to allow interaction during the discovery phase.

In a first discovery mode, called plug and play, the pieces of equipment to be controlled comprise a geolocation chip. Thus, their location relative to the control object is known: no training is required. From the first use, the system automatically determines the piece of equipment to be controlled which must be controlled as soon as the user points at it. It is also possible for the user to change: controlling a particular function or piece of equipment to be controlled, but while pointing elsewhere. The system automatically generates a mapping of all the pieces of equipment to be controlled. There is no need to insert a map or to carry out "training". The system automatically recalculates the coordinates of the pieces of equipment to be controlled each time the user presses on a command: there is no need to store a map. Thus, if the user changes the position of a bulb, its new location is automatically taken into account when a command is pressed on the control object. Alternatively, it is also possible to store a mapping of the pieces of equipment to be controlled permanently, for example when there are many pieces of equipment to be controlled and the system must be very quick to respond when the user presses on a command.

In a second discovery mode, called automatic, the pieces of equipment to be controlled do not comprise a geolocation chip. The user enters the automatic training mode. The network gateway activates each piece of equipment to be controlled individually, so that the user can identify it visually. The user is then required to point at the piece of equipment to be controlled which is activated and to press on a button of the control object or on the touch screen. When the control object has no remote sensor, the user can be required to point several times at the piece of equipment to be controlled from several different positions, so that the system can geolocate the target in the space. Thus, the gateway automatically makes the link between the piece of equipment to be controlled which it has activated and its coordinates, as a result of the user's pointing action. The gateway then activates the next piece of equipment to be controlled. The same method is implemented until all the identified objects in the house have been localized by the system. The system automatically generates a mapping automatically when the user points at pieces of equipment to be controlled. A single pointing action is sufficient when the control object has a remote sensor.

In a third discovery mode, called manual, a virtual envelope is associated with physical objects. In this case, the virtual envelope does not comprise the physical piece of equipment to be controlled. This may be the case when a user wants to point at the fireplace in order to control the thermostat, or point at the window to discover the weather outside, and for the result to be displayed on the control object. This mode is also implemented when the user wants to control a new function which has not been automatically detected by the system, or when the user wants to change the settings for a piece of equipment to be controlled. The user can then control a connected piece of equipment to be controlled or a function by pointing at another zone or another piece of equipment to be controlled. In this case, the user enters the manual training mode and points at the desired zone and indicates to the system the piece of equipment to be controlled that he wants to control each time he points at this zone. For example, the user may want to control the temperature in the room by pointing at the fireplace or a radiator instead of pointing at the thermostat which is situated in another room. The system automatically generates a mapping. A single pointing action is sufficient when the control object has a remote sensor.

In a fourth training mode, called macro, the user can create macros. A macro is a sequence of commands executed after a single action by the user. The user enters the macro training mode: he points and carries out all the commands that he wants to associate with this macro and associates this command sequence with a touch or with a zone of the room. Thus, all the commands are executed by the gateway when the user activates the macro. The macro is activated either by pressing on a macro key, or by pointing at the zone associated with this macro. For example, the user may want to control all his lights at the same time by pointing at a specific zone of the room in order to avoid the need to point at each light in the room in order to control them individually.

Calibration and error management processes will now be described.

According to a first aspect, a training algorithm is proposed. A training algorithm makes it possible to improve the reliability of the system each time a piece of equipment to be controlled, indicated by pointing, is controlled. The system then records the coordinates of the piece of equipment to be controlled and adds its new coordinates to a database. A window for example has a quite large surface area and a user can point at the window without always pointing at the same place. It is then possible to require the user to point at the piece of equipment to be controlled one or more times at different points of the piece of equipment in order to calibrate the system using the training algorithm. For example, in order to control blinds, it is possible to require the user to point at several corners of the window, at the top left, at the bottom right. The system thus learns to delimit the zone of the piece of equipment to be controlled in the space. When the user points at any point on the window, the system recognises that the zone pointed at corresponds to the control of the blinds.

According to a second aspect, a tolerance algorithm is proposed. A certain margin of tolerance is inserted into the system so that the system identifies the piece of equipment to be controlled that the user wants to control, even if the user does not point perfectly at the piece of equipment to be controlled. Thus, if the result of the localization of the piece of equipment to be controlled indicated by pointing does not exactly correspond to the coordinates recorded in the database, but is close to them, the system nevertheless validates the command for this piece of equipment to be controlled.

According to a third aspect, a probability algorithm is proposed. This algorithm makes it possible to determine the most probable piece of equipment to be controlled among several possibilities. When the user points in a direction in order to control a piece of equipment to be controlled and the direction of pointing does not correspond to any coordinate, or corresponds to several coordinates in the database, the algorithm identifies the most probable piece of equipment to be controlled as a function of various data for example such as being the closest to the user and to the control object.

According to a fourth aspect, an error management algorithm is proposed. When the user points to a piece of equipment to be controlled and activates a command, but the command is sent to another piece of equipment to be controlled, the control object comprises a "correction" or "help" button which allows the user to indicate that the wrong piece of equipment to be controlled was controlled. The user presses on this button and manually indicates the piece of equipment to be controlled that he wants to control. In this case, the various algorithms take account of this information so as to always control the piece of equipment to be controlled wanted by the user when he points in that direction. Instead of the "correction" or "help" button, the user can make a specific gesture with the control object which indicates to the system that the command executed is not the one wanted by the user. This gesture is captured by an accelerometer incorporated into the control object. This gesture can be for example that of shaking the control object. In this case, the system cancels the command and applies the command to the second most probable piece of equipment to be controlled.

According to a fifth aspect, a macro or habit training algorithm is proposed. This algorithm makes it possible to detect the user's recurrent patterns of control. Once a recurrent pattern is detected, the gateway can decide to sequence the commands automatically in the form of a macro, without the need for the user to do this. For example, a recurrent pattern may be the consecutive switching on of two lights and closing a blind of the living room at the same time. After several recurrences, the algorithm learns that the user always wants to switch on these two lights and to close the blind at the same time. The gateway can then decide to always switch on the second light and close the blind as soon as the user has switched on the first light.

According to a subsidiary aspect of this fifth aspect, certain contextual elements may be taken into account such as the time, the day or the position of the control object, in order to improve the relevance of the macros or commands and thus predict the wishes of the user. For example, when the user points at the blinds and presses on a command and it is morning, the algorithm determines that the user wants to open the blinds. If the user activates three pieces of equipment to be controlled several times in succession, always within the same time interval, then the algorithm can decide to create an automatic macro which activates the three pieces of equipment to be controlled at once, but only within the same time interval.

An outline of the system will now be described.

The system optionally comprises a gateway. The gateway is an element which centralizes the relative position of the positioning units and the control object, and receives the commands from the user and comprises a device for determining what must be controlled as a function of the relative position of all the elements and the pointing parameters. This determination device can be situated either directly in the control object or in one of the positioning units, or in a separate gateway.

The positioning units can be plugged into the mains electricity supply or into a battery. In this case, this is their only role and they have no other function. Alternatively, the positioning units can be incorporated into controllable pieces of equipment. In this case, the communication of the command for controlling can use the same technology as that used for the localization (UWB or other). The training is not indispensable in this case, as the system knows the relative position of the pieces of equipment to be controlled that can be controlled with respect to the control object.

The control object can be either a remote control, or a tag, or a smartphone.

A remote control can comprise:

indoor geolocation electronics;

an angle sensor such as a gyroscope, a movement sensor such as an accelerometer. The accelerometer also makes it possible to put the remote control into standby mode when no movement is detected in order to save the battery;

a magnetic field sensor;

a pressure sensor in order to determine the height in a house or building having several floors, a distance sensor in order to calculate the distance between the remote control and the piece of equipment to be controlled at which it is pointed;

a display configured to display data automatically as a function of the piece of equipment to be controlled or of the zone pointed at. The data can be:

the current or set temperature for a thermostat or a radiator;

the state of a light or a bulb, off or on;

the current colour of an RGB light;

the state of the blinds, open or closed;

the volume, title of songs, playlist, or the name of the radio station in the case of a music source;

the open or closed state, or also a video of the person who has rung at the doorway in the case of a doorway, the screen can display;

the remaining cooking time or the current temperature of the oven when a user points at an oven.

When a music source is pointed at, a Shazam-type search of the current music is automatically generated and the result is displayed on the screen. The result can be the title of the clip, the name of the album or the artist. In this case, the remote control incorporates a sound sensor.

The remote control can be without a display.

The remote control is configured so that its display is dynamically adapted in real time as soon as the remote control is picked up. It displays the information associated with everything it is pointed at. An accelerometer makes it possible to detect the movements of the remote control and switch on its display and conversely, switch off its display when the remote control is put down and no longer moves.

The remote control can be powered by batteries changed by the user or by rechargeable batteries. In the latter case, the user places the remote control on a base in order to recharge the batteries of the remote control.

The control object can be a tag. In the case of a tag, only the sensors used for localization are present. The user keeps the tag about his person when he moves within a house, for example so that light and music follow him. In this hypothetical case, the user does not point at any piece of equipment to be controlled, this is a passive control.

The control object can be a smartphone.
  either the smartphone incorporates an indoor geolocation technology and the other sensors required for angle and distance calculation;
  or an additional accessory is added to the smartphone: this accessory comprises the necessary technology for indoor localization, and is connected either physically to the smartphone (jack, USB, lightning plug), or wirelessly via Bluetooth, BLE, Wifi etc. This accessory is firmly fixed to the smartphone so that the position of the smartphone can be determined.

Commands will now be described.

The commands can be carried out with a touch screen following the menus of commands described below.

Alternatively or in combination with the touch screen, the commands can be implemented in the form of buttons such as
  + and − buttons,
  ON/OFF buttons,
  Change colours buttons,
  1, 2, 3, A, B, C etc buttons. These buttons can make it possible to activate:
    macros;
    or pre-recorded ambiance effects. An ambiance effect can be subdued, warm lights, bright, cold lights, closing the blinds and lowering the intensity of the lights for watching a film, switching off all the lights and lowering all the blinds, etc.

The commands are either active or passive.

In the case of an active command, the user points at a piece of equipment to be controlled in order to control pieces of equipment to be controlled that are directly visible or to control pieces of equipment to be controlled that are not directly visible. An example of controlling a piece of equipment to be controlled that is not visible is that of controlling a living-room light from the kitchen or also controlling all the roller blinds in the house.

In the case of a passive command, the user moves around with the remote control or a tag in his pocket. The pieces of equipment to be controlled are automatically activated as a function of the localization of the remote control or the tag. The lights and the music are switched on automatically as a function of the position of the remote control or of the tag and thus follow the user from room to room as a function of his localization. For example, the lights and the music of the rooms where the user is not present switch off, and conversely switch on in the room where he is present. In another example, the door of the garage opens when the user approaches the door with the tag on his key ring. In yet another example, the blinds close, the lights switch off and the doorway closes when the user leaves the house.

Figure 2:
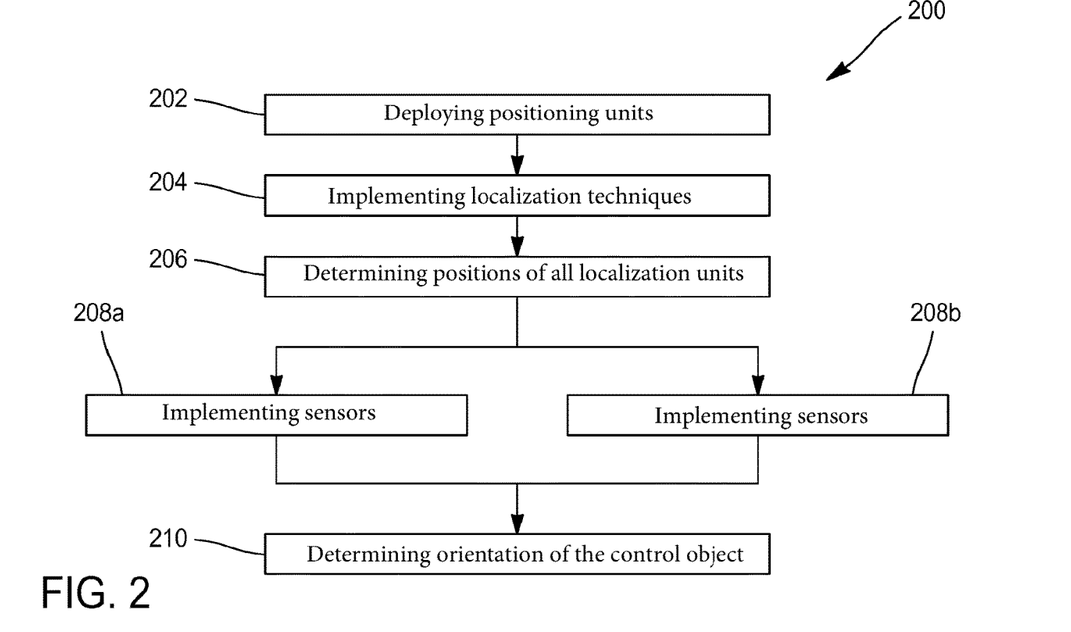
FIG. 2 shows diagrammatically a first embodiment of a method for the determination of a piece of equipment to be controlled according to the invention.

FIG. 2 shows diagrammatically a first embodiment of a determination method 200 of a piece of equipment to be controlled by a control object placed in a space comprising positioning units capable of determining their relative positions in relation to one another.

Step 202 is a step of random deployment of positioning units. Some of these positioning units are capable of knowing their absolute positions with respect to the earth and are then called anchor units.

Step 204 is a step of implementing localization techniques. These techniques are tri-lateration or triangulation based on data relating to a signal received such as angle of arrival (AOA), time of arrival (TOA), time difference of arrival (TDOA), received signal strength indication (RSSI), the quality of the signal received (link quality LQ) or also the technique of measuring the electromechanical field (EMF).

At the intermediate result step 206, the positions of all the localization units are known with respect to the anchor units. The absolute positions of all the localization units are thus known with respect to the earth.

After step 206, the method selectively implements one or other of the two steps:
  in step 208a, the method implements sensors of orientation with respect to the space formed by the positioning units. These sensors can implement techniques such as EMF, AOA, directional transmission;
  in step 208b, the method implements sensors of absolute orientation with respect to the earth. These sensors are for example accelerometers or magnetometers.

After steps 208a and 208b, the method implements intermediate results step 210.

In step 210, the orientation of the control object with respect to the earth is known. The orientation of the control object with respect to the nodes is therefore easily deduced therefrom.

Thus, the method according to FIG. 2 implements a step of determination of the position and orientation of the control object in the space based on the positions of the positioning units.

A step of determination of a sense of pointing by the control object based on the position and orientation of the control object that have been determined in this way is then implemented. It is sufficient for example to know the position of two points of the control object relative to the position of the control object in order to determine the sense of pointing of the control object.

The method then implements a step of determination of a piece of equipment to be controlled based on the sense determined in this way. Different possibilities for determination of the piece of equipment to be controlled based on the sense determined in this way will be described hereinafter.

Figure 3:
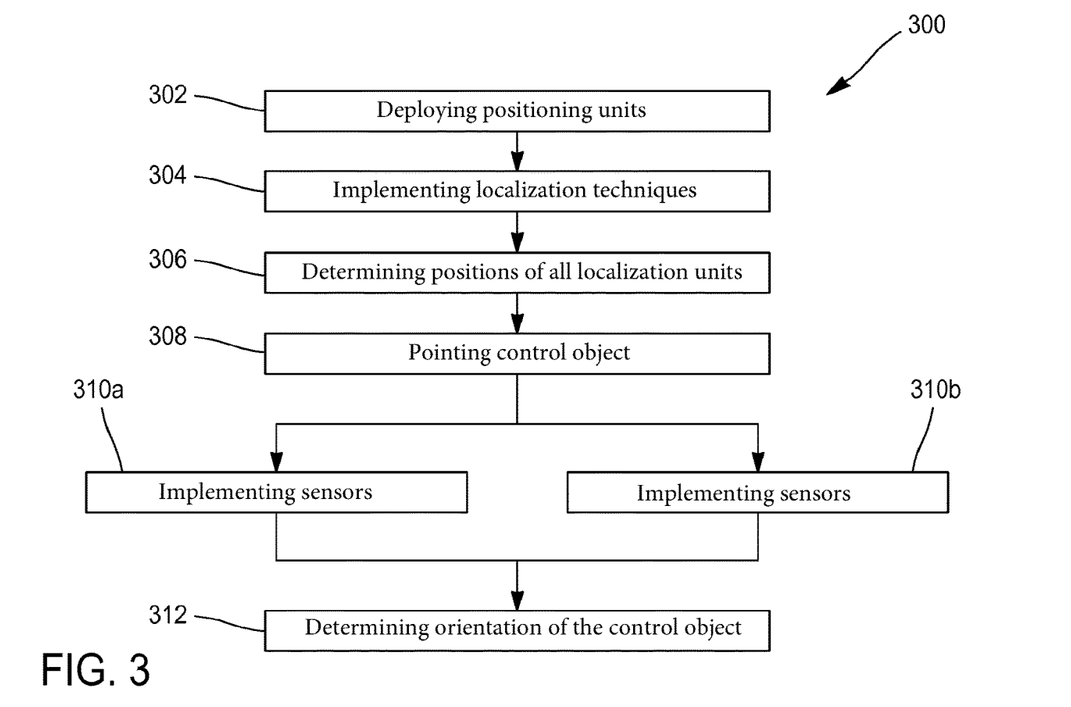
FIG. 3 shows diagrammatically a second embodiment of a method for the determination of a piece of equipment to be controlled according to the invention.

FIG. 3 shows diagrammatically a second embodiment of a determination method 300 of a piece of equipment to be controlled by a control object placed in a space comprising positioning units capable of determining their relative positions in relation to one another.

Step 302 is a step of random deployment of positioning units. None of these positioning units knows its absolute position with respect to the earth.

Step 304 is a step of implementation of localization techniques without anchoring chosen such that the tri-lateration or triangulation based on data relating to a signal received such as the angle of arrival (AOA), time of arrival (TOA), time difference of arrival (TDOA), received signal strength indication (RSSI), LQ, EMF, etc.

In step 306, the positions of all the localization units are determined with respect to one another in the space relating to the localization units.

In step 308, the user points the control object in the direction of each of the localization units, one after another.

After step 308, the method selectively implements two steps:
- in step 308a, the method implements sensors of orientation with respect to the space formed by the positioning units. These sensors can implement techniques such as EMF, AOA, directional transmission;
- in step 308b, the method implements sensors of absolute orientation with respect to the earth. These sensors are for example accelerometers or magnetometers.

After steps 308a and 308b, the method implements step 310.

In step 310, the orientation of the control object with respect to the space of the localization units is deduced.

Thus, the method according to FIG. 3 implements a step of determination of the position and orientation of the control object in the space based on the positions of the positioning units.

A step of determination of a sense of pointing by the control object based on the position and orientation of the control object that have been determined in this way is then implemented. It is sufficient for example to know the position of two points of the control object relative to the position of the control object in order to determine the sense of pointing of the control object.

The method then implements a step of determination of a piece of equipment to be controlled based on the sense determined in this way. Different possibilities for determination of the piece of equipment to be controlled based on the sense determined in this way are described hereinafter.

Figure 4:
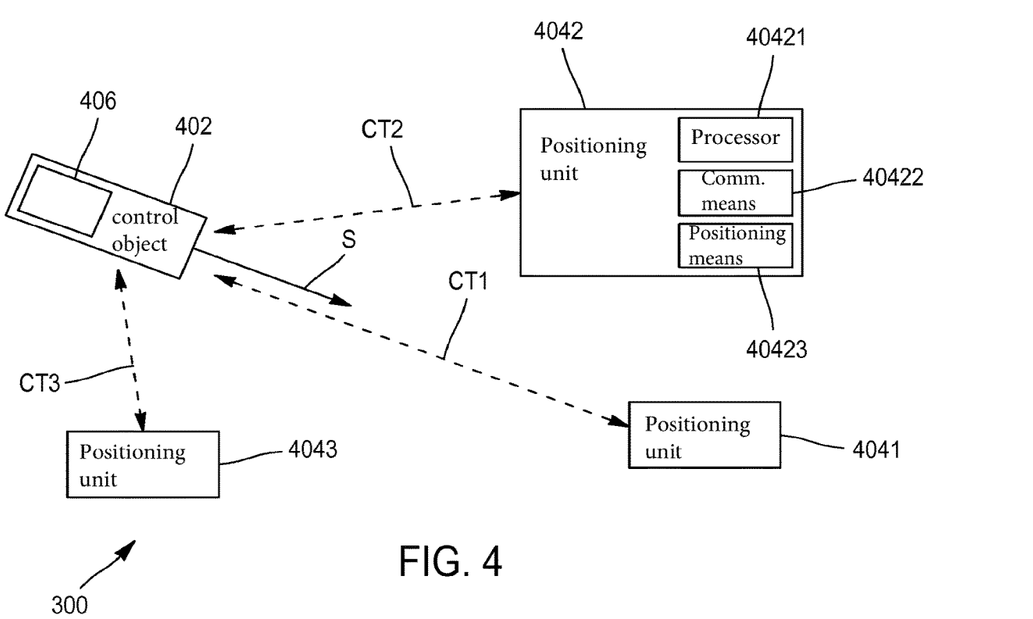
FIG. 4 shows diagrammatically a control system according to the invention of the "automatic" type.

FIG. 4 shows an embodiment of a control system 400 according to the invention.

The control system 400 comprises:
- a control object 402 arranged in a space,
- three positioning units 4041, 4042, 4043 in this space.

The three positioning units 4041, 4042, 4043 are capable of determining their relative positions in relation to one another. In addition, each of the positioning units is a piece of equipment to be controlled.

The positioning unit 4042 comprises:
- a processor 40421,
- communication means 40422 connected to the processor 40421, and
- positioning means 40423 connected to the processor 4021.

Each of the positioning units comprises pieces of equipment similar to the pieces of equipment of the positioning unit 4042. The respective communication means of the positioning units are configured to exchange information data between one another. These communication means are also each configured to exchange information data with the control object.

The control object 402 comprises a device 406 for controlling at least one piece of equipment to be controlled according to the invention and a communication means. The control object 402 also comprises a touch-sensitive display screen and/or buttons of the control object. The device 406 comprises means arranged for determining relative positions in the space of the three positioning units, means for the determination of the position and orientation of the control object 402 in the space based on the determined positions of the positioning units, means for the determination of a sense of pointing S by the control object 402 based on the position and orientation of this control object that have been determined in this way, Thus, the control device 406 is configured to implement the methods for the determination of a piece of equipment to be controlled and to control a piece of equipment according to the invention.

With reference to the first two figures, a description is given hereinafter of two embodiments for:
- determining the position and orientation of the control object 402 in the space based on the positions of the positioning units, and
- determining a sense of pointing S by the control object 402 based on the position and orientation of the control object that have been determined in this way, Various exchanges are carried out between the control device and the positioning units, which is shown by the arrows CT1, CT2, and CT3 in FIG. 4.

In this embodiment of the "plug and play" type, the pieces of equipment to be controlled thus comprise the positioning units. Therefore, no training of the position of the piece of equipment to be controlled is required. The localization relative to the control object is known. From the first use, the system automatically knows which piece of equipment must be controlled as soon as the sense of pointing S by the control object points at it.

The system automatically generates a mapping of all the controllable pieces of equipment. The system automatically recalculates the virtual envelopes of the pieces of equipment to be controlled each time the user implements a function of the control object, and there is no need for a map to be stored. For example, if the user changes the position of a bulb, its new location is automatically taken into account when a key is pressed on the control object.

Alternatively, it is also possible to store a mapping of the pieces of equipment to be controlled permanently. This can be advantageous when a large number of pieces of equipment to be controlled are present and a quick reaction by the system is expected.

Figure 5:
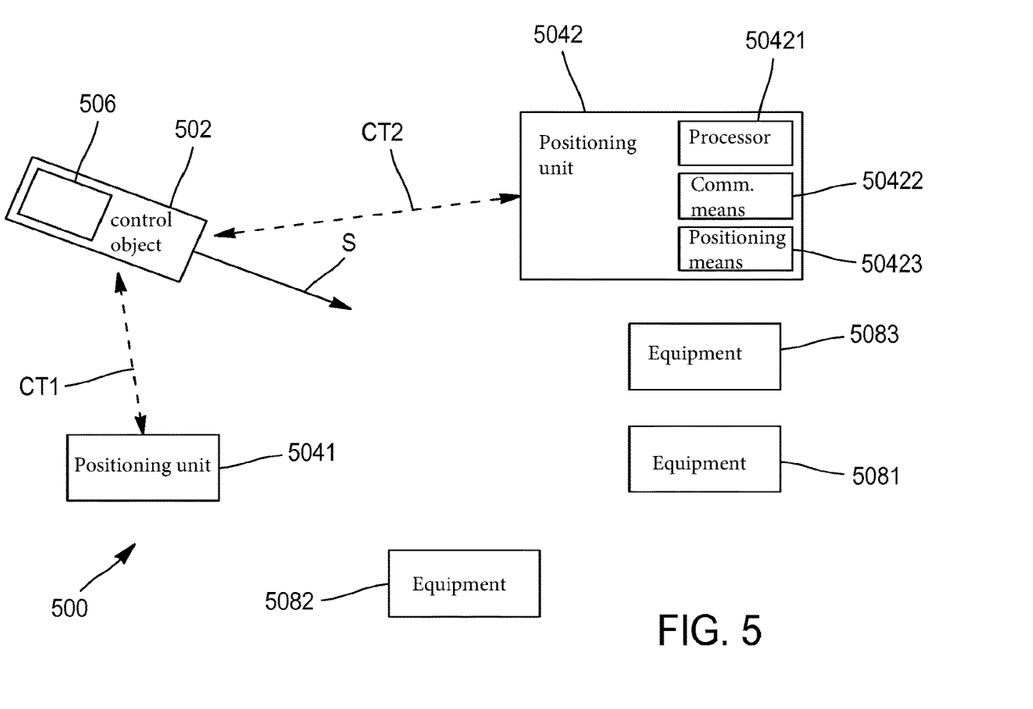
FIG. 5 shows diagrammatically a control system according to the invention of the "manual" type.

FIG. 5 shows a second embodiment of a control system 500 according to the invention.

The control system 500 comprises:
- a control object 502 arranged in a space,
- two positioning units 5041, 5042 in this space, and
- three pieces of equipment to be controlled 5081, 5082, 5083.

The two positioning units 5041 and 5042 are capable of determining their relative positions in relation to one another. None of these positioning units is a piece of equipment to be controlled.

The positioning unit 5042 comprises:
- a processor 50421,
- communication means 50422 connected to the processor 50421, and
- positioning means 50423 connected to the processor 5021.

Each of the positioning units comprises pieces of equipment similar to the pieces of equipment of the positioning unit 5042. The respective communication means of the positioning units 5041 and 5042 are configured to exchange information data between one another.

The control object 502 comprises a device 506 for controlling at least one piece of equipment to be controlled according to the invention. The device 506 comprises means arranged for determining relative positions in the space of the three positioning units, means for the determination of the position and orientation of the control object 502 in the space based on the determined positions of the positioning units 5041 and 5042, means for the determination of a sense of pointing S by the control object 502 based on the position and orientation of this control object that have been determined in this way, Thus, the control device 506 is configured to implement the methods for the determination of a piece of equipment to be controlled and to control a piece of equipment according to the invention.

With reference to the first two figures, a description is given hereinafter of two embodiments for:

determining the position and orientation of the control object 402 in the space based on the positions of the positioning units, and determining a sense of pointing S by the control object 502 based on the position and orientation of the control object that have been determined in this way, Various exchanges are carried out between the control device and the positioning units, which is shown by the arrows CT1, CT2, and CT3 in FIG. 5.

In this embodiment of the "plug and play" type, the pieces of equipment to be controlled 5081, 5082, 5083 have no geolocation unit. A user of the control device 406 is required to implement an automatic training mode. In this training mode, the system according to the invention activates sequentially each of the pieces of equipment to be controlled 4081, 4082, 4083 individually so that the user can visually identify this piece of equipment.

For each piece of equipment to be controlled that is activated by the system, the user must point several times based on different position/sense pairs, using the control object 502, at the virtual envelope of this piece of equipment to be controlled 5081, 5082, 5083 and carry out a specific action on the control object, for example pressing on a button of the control object or on a touch screen thereof.

When the control object has a distance sensor, the system requires the knowledge of a single position/sense pair.

The system thus learns to make a link between the piece of equipment to be controlled and a part of the virtual envelope associated with the piece of equipment to be controlled thus defined by use.

The system then activates the next piece of equipment to be controlled and so on and so forth until all pieces of equipment to be controlled that are identified in the house are localized by the system.

The system automatically generates a mapping when the user points at pieces of equipment to be controlled. The mapping must be retained so as not to lose the training of the localization of the virtual envelopes.

Thus, the virtual envelope of at least one piece of equipment to be controlled is defined on the basis of a plurality of determinations of position and orientation of the control object in the space based on the positions of the positioning units, and of a plurality of determinations of sense indicated by pointing by the control object based on a plurality of positions and orientations of the control object that are determined in this way.

As understood in the light of the description of FIG. 5, the positioning units then only play the role of positioning units.

With reference to FIG. 4, the positioning units are incorporated into the pieces of equipment to be controlled. In this case, the control of the piece of equipment to be controlled can advantageously implement the same technology for communication as that used for localization. Advantageously, a technology such as ultra wideband (UWB) may be used.

A step of determination of a piece of equipment to be controlled based on the sense determined in this way by a control device according to the invention is now described in greater detail.

The piece of equipment to be controlled is that associated with the virtual envelope that is closest to the axis of pointing in the sense S of the control object determined by the control device.

When the sense of pointing by the control object corresponds to several possibilities for the virtual envelope of the piece of equipment to be controlled, the most probable virtual envelope is selected: the virtual envelope most probably indicated by pointing is the virtual envelope that is the closest in the space to the control object (therefore the user).

Furthermore, when the piece of equipment to be controlled that is determined by the system based on the sense of the control object is considered to be incorrect by the user, the user can indicate that the wrong piece of equipment to be controlled has been determined. In this case, algorithms for the management of the virtual envelope associated with this piece of equipment take account of this information so as to always control this piece of equipment when the user points in this direction. In this case, the system can automatically cancel the first command that the user considers incorrect and apply the same command to the second most probable virtual envelope after the first.

In order to indicate that the command is incorrect, the user can either press a button (physical or touch zone), or make a specific gesture with the control object which will be captured by a sensor of the accelerometer type and interpreted by the control object.

The piece of equipment to be controlled can thus be associated with one or more virtual envelopes. To this end, the system implements a routine training mode. Thus, the system can detect that a user usually switches on two lights and closes a blind of the living room within a short period of time. The system then controls the switching of the other light and closing of the blind as soon as it has determined based on the sense of pointing by the control object that the piece of equipment to be controlled is one of the two lights.

A virtual envelope is defined as a zone of the space of the positioning units that is associated with a piece of equipment to be controlled. Different possibilities for the determination of a virtual envelope are now described.

The virtual envelope is partially defined by the implementation of a training algorithm. A training algorithm makes it possible to improve the reliability of the system each time a piece of equipment is controlled. The system records information relating to the determined sense of the control object and augments the virtual envelope of the piece of equipment to be controlled with this information. A definition of the virtual envelope of a piece of equipment to be controlled is possible by interaction with a user. For example, in order to control blinds, it is possible to require the user to point at several corners of the window, at the top left, at the bottom right. The system thus learns to delimit the virtual envelope of the window in the space. When the user points at any point on the window, i.e. inside the virtual envelope relating to the blinds, the system recognises that the zone pointed at corresponds to the control of the blinds.

The virtual envelope is also defined by the implementation of a tolerance algorithm. The tolerance algorithm increases the volume of the previously defined virtual envelope.

In an embodiment of the control object, the latter comprises buttons and a display screen. The control interface of the control object is adapted as a function of the piece of equipment to be controlled. The control object comprises:
- + and – buttons for increasing or reducing respectively an intensity relating to the piece of equipment to be controlled, for example the volume of sound or brightness of lighting,
- ON, OFF buttons for respectively switching on or switching off the piece of equipment to be controlled,
- buttons for changing colour, for example for changing the colour of a light,
- buttons for controlling macros, for example for controlling a plurality of pieces of equipment or controlling pre-recorded ambiance effects such as subdued, warm lights, bright, cold lights, closing the blinds and lowering the intensity of the light for watching a film, sequentially switching off all the lights and lowering all the blinds, etc.

Of course, other embodiments of the control object can be envisaged such as the implementation of a touch-sensitive surface. The control interface of the control object and the command itself adapt as a function of the piece of equipment to be controlled. The command is also adapted as a function of the number of fingers used (1 finger, 2 fingers, 3 fingers, etc.) and the movement carried out with these fingers on the touch-sensitive surface (from bottom to top, from left to right, etc.) Thus, the command communicated in order to control the piece(s) of equipment controlled is adapted as a function of the combination of the zone at which the control object is pointed, and movements of the fingers made on the touch-sensitive surface.

Of course, the user can configure the control object as he wants in order to control all of the functionalities of the piece of equipment to be controlled.

Of course, the invention is not limited to the examples which have just been described and numerous adjustments can be made to these examples without exceeding the scope of the invention. In addition, the different characteristics, forms, variants and embodiments of the invention can be combined together in various combinations if they are not incompatible or mutually exclusive.

The control device can for example be an accessory added to the control object. The control object can be produced in the form of a smartphone.

The invention claimed is:

1. A method carried out by a smartphone incorporating an Ultra-wideband (UWB) localization chip, the method comprising:
   determining, with the smartphone, one or more of a position and orientation of the smartphone based on the UWB localization chip;
   determining, with the smartphone, a piece of equipment being pointed at from a plurality of pieces of equipment as a function of the one or more of the position and orientation of the smartphone, wherein determining the piece of equipment being pointed at from the plurality of pieces of equipment is based on a tolerance algorithm and at least one virtual envelope defined for at least one piece of equipment of the plurality of pieces of equipment;
   adapting, with the smartphone, a control interface through a touchscreen of the smartphone as a function of the piece of equipment being pointed at;
   displaying, with the smartphone, at least one item of information on the control interface as a function of the piece of equipment being pointed at;
   receiving, through the control interface of the smartphone, at least one command from a user to control the piece of equipment being pointed at;
   generating, with the smartphone, control data configured to control the piece of equipment being pointed at based on the at least one command received from the user;
   controlling the piece of equipment being pointed at by transmitting the control data with the smartphone; and
   updating a virtual envelope for the piece of equipment being pointed at based on the one or more of the position and orientation of the smartphone.

2. The method of claim 1, wherein the control data is generated as a function of the piece of equipment being pointed at.

3. The method of claim 1, wherein the control interface is adapted automatically in response to determining the piece of equipment being pointed at.

4. The method of claim 1, wherein the at least one command comprises a single user action configured to launch a sequence of commands.

5. The method of claim 1, wherein determining the piece of equipment being pointed at comprises predicting the piece of equipment being pointed at.

6. The method of claim 5, wherein predicting the piece of equipment being pointed at is based at least partially on contextual data detected by the smartphone, the contextual data comprising at least one of the following: a time the smartphone is used, a date the smartphone is used, a position of the smartphone, user responses to questions, a pattern of repeated commands received from the user, or any combination thereof.

7. The method of claim 5, wherein predicting the piece of equipment being pointed at is based at least partially on habit data of the user associated with the smartphone.

8. The method of claim 7, further comprising:
   generating the habit data based on recurrent patterns of commands received through the smartphone.

9. The method of claim 1, wherein determining the piece of equipment being pointed at is based on at least one of a position and orientation of the smartphone determined from at least one of the following: a geolocation device, an angle sensor, a movement sensor, a magnetic field sensor, a pressure sensor, a distance sensor, or any combination thereof.

10. The method of claim 1, wherein the control interface comprises a touchscreen, and wherein the at least one command received from the user comprises at least one input received through a surface of the touchscreen.

11. The method of claim 1, wherein the control interface comprises at least one of the following: a button configured to increase an intensity of the piece of equipment being pointed at, a button configured to reduce an intensity of the piece of equipment being pointed at, a button configured to turn on the piece of equipment being pointed at, a button configured to turn off the piece of equipment being pointed at, a button configured to launch a sequence of commands, a button to change a light color, or any combination thereof.

12. The method of claim 1, wherein determining the piece of equipment being pointed at from the plurality of pieces of equipment comprises:
   determining that a direction that the user points the smartphone in corresponds to at least two pieces of equipment; and
   determining the piece of equipment from the at least two pieces of equipment based on a probability algorithm.

13. The method of claim 1, wherein determining the piece of equipment being pointed at from the plurality of pieces of equipment comprises:
   determining that a direction that the user points the smartphone in does not correspond to any piece of equipment; and
   in response to determining that the direction does not correspond to any piece of equipment, determining the piece of equipment from the plurality of pieces of equipment based on the tolerance algorithm.

14. The method of claim 1, wherein an interaction of the user confirming the piece of equipment comprises a manual press indicating the piece of equipment.

15. The method of claim 1, wherein the control data is transmitted via UWB communication.

16. The method of claim 1, wherein an interaction confirming the piece of equipment being pointed at comprises a predefined gesture.

17. The method of claim 1, further comprising:
   prior to confirming the piece of equipment being pointed at, invalidating, with the smartphone, a different piece of equipment selected for control based on an interaction of the user through the touchscreen of the smartphone.

18. The method of claim 1, wherein the at least one piece of equipment comprises at least two pieces of equipment, and wherein determining the piece of equipment being pointed at comprises determining which piece of equipment of the at least two pieces of equipment is located in a direction corresponding to the orientation of the smartphone.

19. The method of claim 1, wherein an interaction confirming the piece of equipment being pointed at occurs after receiving the at least one command.

20. The method of claim 1, wherein the at least one piece of equipment comprises at least two pieces of equipment, and wherein determining the piece of equipment being pointed at comprises determining which piece of equipment of the at least two pieces of equipment based on a manual indication by the user.

21. The method of claim 1, wherein determining the orientation of the smartphone based on the UWB localization chip comprises:
   determining, with the smartphone, a position of the at least one piece of equipment of the plurality of pieces of equipment based on the UWB localization chip; and
   determining, with the smartphone, the orientation of the smartphone in relation to the at least one piece of equipment based on the position of the at least one piece of equipment, wherein the piece of equipment being pointed at is determined from the at least one piece of equipment as a function of the orientation and the position.

22. The method of claim 21, wherein determining the orientation of the smartphone in relation to the at least one piece of equipment is based on at least one angle of reception of a radio signal received by the smartphone or at least one positioning unit associated with the at least one piece of equipment.

23. The method of claim 1, further comprising confirming, with the smartphone, the piece of equipment being pointed at based on an interaction of the user through the touchscreen of the smartphone.

24. The method of claim 1, wherein determining the position and/or orientation of the smartphone is further based on at least one other UWB localization chip in the at least one piece of equipment to be controlled.

25. The method of claim 1, wherein determining the piece of equipment being pointed at from the plurality of pieces of equipment comprises:
   determining, based on the UWB localization chip, a distance between the smartphone and a different piece of equipment of the plurality of pieces of equipment; and
   determining the piece of equipment being pointed at based on the distance between the smartphone and the different piece of equipment.

26. The method of claim 25, wherein the different piece of equipment to be controlled is configured to communicate with the smartphone via UWB.

27. The method of claim 1, wherein determining the piece of equipment being pointed at from the plurality of pieces of equipment comprises:
   determining a distance between the smartphone and the piece of equipment to be controlled based on the UWB localization chip; and
   determining the piece of equipment to be controlled from among the plurality of pieces of equipment based on the distance.

28. The method of claim 1, wherein determining the piece of equipment being pointed at from the plurality of pieces of equipment comprises:
   determining a second most probable piece of equipment being pointed at as a function of the position and/or orientation of the smartphone;
   determining a distance between the smartphone and the second most probable piece of equipment; and
   displaying at least one item of information on the control interface based on the distance between the smartphone and the second most probable piece of equipment.

29. The method of claim 1, wherein the at least one virtual envelope is defined by a determination of a convex envelope based on pointing the smartphone.

30. A smartphone for controlling a plurality of pieces of equipment, comprising:
   a touchscreen display comprising a control interface;
   an Ultra-wideband (UWB) localization chip; and
   at least one processor in communication with the display and the UWB localization chip, the at least one processor programmed to:
      determine an orientation of the smartphone being pointed by a user in relation to at least one piece of equipment being pointed at based on the UWB localization chip;
      determine a piece of equipment being pointed at from a plurality of pieces of equipment as a function of the orientation of the smartphone and based on a tolerance algorithm and at least one virtual envelope defined for at least one piece of equipment of the plurality of pieces of equipment;
      confirm the piece of equipment being pointed at based on an interaction of the user through a touchscreen of the smartphone;
      adapt the control interface as a function of the piece of equipment being pointed at;

display at least one item of information on the control interface as a function of the piece of equipment being pointed at;
receive, through the control interface, at least one command from the user to control the piece of equipment being pointed at;
generate control data to control the piece of equipment being pointed at based on the at least one command received from the user;
control the piece of equipment being pointed at by transmitting the control data; and
update a virtual envelope for the piece of equipment being pointed at based on the orientation of the smartphone.

31. The smartphone of claim 30, wherein the control data is generated as a function of the piece of equipment being pointed at.

32. The smartphone of claim 30, wherein the control interface is adapted automatically in response to determining the piece of equipment being pointed at.

33. The smartphone of claim 30, wherein the at least one command comprises a single user action to launch a sequence of commands.

34. The smartphone of claim 30, wherein determining the piece of equipment being pointed at comprises predicting the piece of equipment being pointed at.

35. The smartphone of claim 34, wherein predicting the piece of equipment being pointed at is based at least partially on contextual data detected by the smartphone, the contextual data comprising at least one of the following: a time the smartphone is used, a date the smartphone is used, a position of the smartphone, user responses to questions, a pattern of repeated commands received from the user, or any combination thereof.

36. The smartphone of claim 34, wherein predicting the piece of equipment being pointed at is based at least partially on habit data of the user associated with the smartphone.

37. The smartphone of claim 36, wherein the at least one processor is further programmed to generate the habit data based on recurrent patterns of commands received through the smartphone.

38. The smartphone of claim 30, further comprising at least one of the following: a geolocation device, an angle sensor, a movement sensor, a magnetic field sensor, a pressure sensor, a distance sensor, or any combination thereof.

39. The smartphone of claim 30, wherein the control interface comprises a touchscreen, and wherein the at least one command received from the user comprises at least one input received through a surface of the touchscreen.

40. The smartphone of claim 30, wherein the control interface comprises at least one of the following: a button configured to increase an intensity of the piece of equipment being pointed at, a button configured to reduce an intensity of the piece of equipment being pointed at, a button configured to turn on the piece of equipment being pointed at, a button configured to turn off the piece of equipment being pointed at, a button configured to launch a sequence of commands, a button to change a light color, or any combination thereof.

41. A remote control comprising:
an Ultra-wideband (UWB) localization chip;
at least one processor in communication with the UWB localization chip, the at least one processor programmed to:
determine an orientation of the remote control being pointed at by a user in relation to at least one piece of equipment based on the UWB localization chip; and
determine a piece of equipment being pointed at from a plurality of pieces of equipment as a function of the orientation of the remote control based on a tolerance algorithm and at least one virtual envelope defined for at least one piece of equipment of the plurality of pieces of equipment;
a touchscreen display including a control interface configured to:
automatically adapt the control interface in response to the remote control being pointed at the piece of equipment as a function of the piece of equipment being pointed at;
display at least one item of information on the control interface as a function of the piece of equipment being pointed at;
receive, through the control interface, at least one command from the user to control the piece of equipment being pointed at;
generate control data to control the piece of equipment being pointed at based on the at least one command received from the user; and
update a virtual envelope for the piece of equipment being pointed at based on the orientation of the remote control; and
a communication device in communication with the at least one processor, the communication device configured to transmit the control data to the piece of equipment being pointed at.

42. A non-transitory computer program product for controlling a plurality of pieces of equipment, comprising a computer-readable medium including program instructions that, when executed by a processor of a smartphone, cause the processor to:
determine an orientation of the smartphone being pointed by a user in relation to at least one piece of equipment based on an Ultra-wideband (UWB) localization chip, the smartphone comprising a touchscreen display including a control interface;
determine a piece of equipment being pointed at from a plurality of pieces of equipment as a function of the orientation of the smartphone based on a tolerance algorithm and at least one virtual envelope defined for at least one piece of equipment of the plurality of pieces of equipment;
adapt the control interface as a function of the piece of equipment being pointed at;
display at least one item of information on the control interface as a function of the piece of equipment being pointed at;
receive, through the control interface, at least one command from the user to control the piece of equipment being pointed at;
generate control data to control the piece of equipment being pointed at based on the at least one command received from the user;
control the piece of equipment being pointed at by transmitting the control data; and
update a virtual envelope for the piece of equipment being pointed at based on the orientation of the smartphone.

* * * * *